United States Patent Office

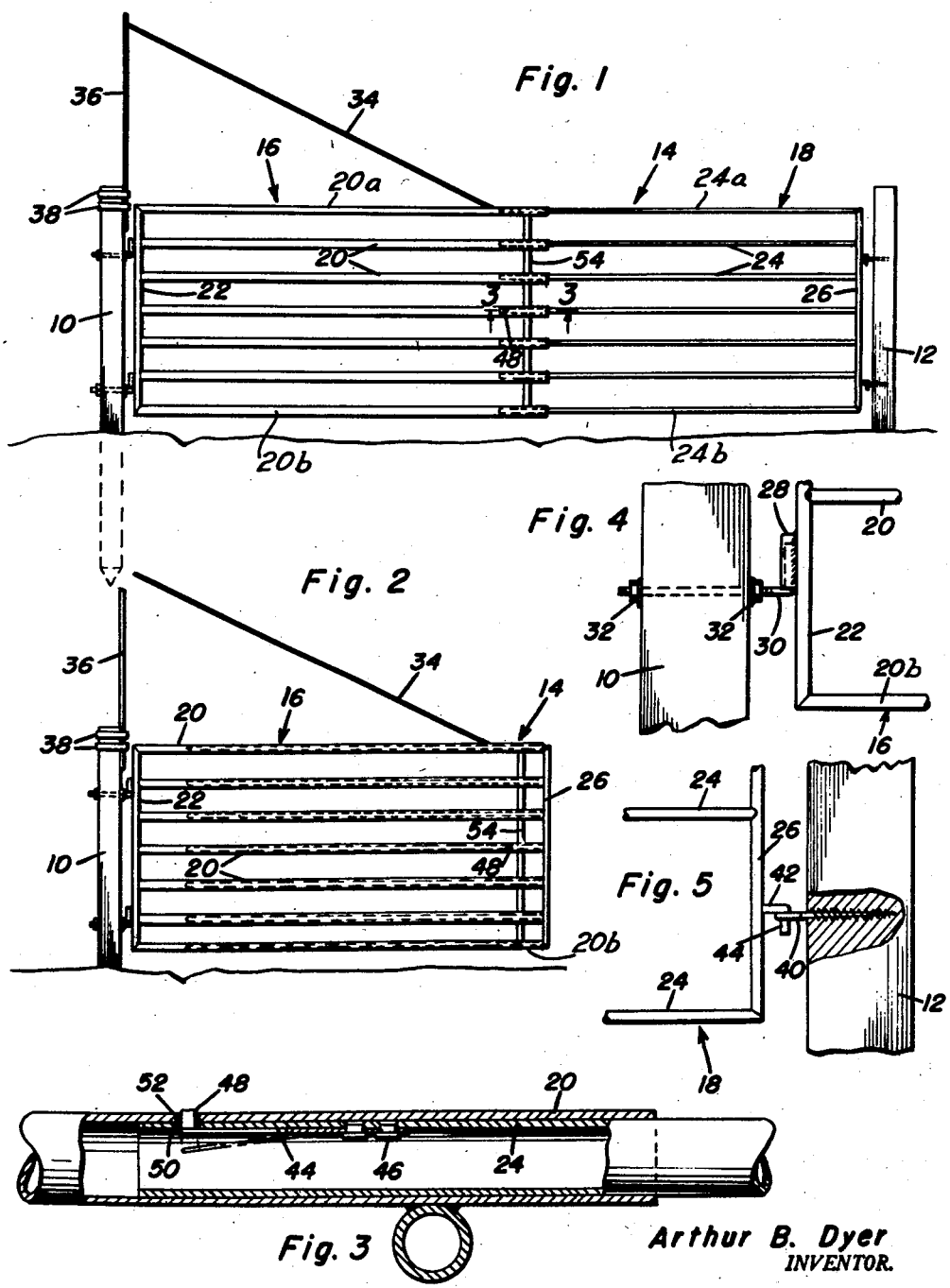

2,701,927
Patented Feb. 15, 1955

2,701,927

TELESCOPING GATE

Arthur B. Dyer, Philippi, W. Va.

Application July 24, 1952, Serial No. 300,697

2 Claims. (Cl. 39—87)

This invention relates in general to gates, and more specifically to a telescoping gate structure.

The primary object of this invention is to provide an improved gate which may be opened by either swinging the same about a vertical axis or by telescoping the same to reduce its effective length.

Another object of this invention is to provide an improved telescoping gate which is relatively light in weight and of a simple construction whereby the same may be easily and quickly assembled.

Another object of this invention is to provide an improved gate which is formed of readily obtainable materials which may be quickly and easily assembled whereby the same is economically feasible.

A further object of this invention is to provide an improved fence section, said fence section being of an adjustable length whereby the same may be utilized to fit various size openings.

A still further object of this invention is to provide an improved telescoping fence section which is extremely light in weight whereby the same may be easily and quickly transported, said fence section being of a telescopic nature whereby the same may be reduced in length for purposes of storage and transporting the same.

With these objects definitely in view, this invention resides in certain novel features or construction, combination and arrangement of elements and portions as will be hereinafter described in detail in the specification, particularly pointed out in the appended claims, and illustrated in the accompanying drawings which form a material part of this application and in which:

Figure 1 is an elevational view of the gate showing the same extending between two gate posts in its gateway closing position;

Figure 2 is an elevational view similar to Figure 1 and shows the gate of Figure 1 in its telescoped state;

Figure 3 is an enlarged fragmentary transverse horizontal sectional view taken substantially upon the plane indicated by the section line 3—3 of Figure 1 and shows the manner in which the telescoping sections of the gate of Figure 1 are locked in extended relation;

Figure 4 is an enlarged fragmentary elevational view showing the manner in which an end post of the gate of Figure 1 is hingedly connected to one of the gate posts; and Figure 5 is an enlarged fragmentary elevational view showing the manner in which an opposite end member of the gate of Figure 1 is releasably latched to the other of said gate posts, a portion of the gate post being broken away and shown in section in order to illustrate the manner in which a latch element is connected thereto.

Similar characters of reference designate similar or identical elements and portions throughout the specification and throughout the different views of the drawings.

Referring now to the drawings in particular, it will be seen that there is illustrated a gateway defined by first and second gate posts 10 and 12, respectively. Extending between the gate posts and closing the gateway is an improved gate, which is the subject of this invention, the gate being referred to in general by the reference numeral 14. It will be noted that the gate 14 is formed in two sections, which are referred to in general by the reference numerals 16 and 18.

The gate section 16 includes a plurality of horizontally extending, spaced parallel tubular members 20 located intermediately of spaced elongated substantially parallel upper and lower tubular members 20a and 20b respectively, all of which are secured at their outer ends to a common end member 22. The gate section 18 is of a similar construction to the gate section 16 and includes a plurality of spaced parallel members 24 located intermediately of spaced elongated substantially parallel upper and lower tubular members 24a and 24b respectively, all of which are connected at their ends to a common end member 26. The members 24, 24a and 24b are spaced apart the same distance as are the tubular members 20, 20a and 20b and have their inner ends disposed within the inner ends of the tubular members 20, 20a and 20b in telescoping relation.

In order that the gate sections 16 and 18 may be swung with respect to and supported by the gate posts 10 and 12, the end member 22 of the gate section 16 is provided with a pair of vertically aligned spaced sleeve members 28 which are received over vertically extending inner ends of hinge pins 30 carried by the gate post 10. The hinge pins 30 are secured to the gate post 10 by a pair of nuts 32 disposed on opposite ends thereof.

Inasmuch as the gate 14 is of a relatively long length and it is cantilevered from the gate post 10, the gate section 16 is braced by a diagonal brace 34 secured to the inner end of the upper tubular member 20a. The diagonal brace 34 is connected at its upper outer end to the upper end of a vertical standard 36 which extends upwardly from the upper end of the gate post 10 and is secured thereto by a plurality of straps 38.

Referring now to Figures 1 and 5 in particular, it will be seen that the gate post 12 is provided with a pair of vertically aligned spaced eye bolts 30 which have their eyes extending inwardly from the gate post 12. The end member 26 of the gate section 18 is provided with a pair of latch elements 42 having downwardly projecting legs 44 which are adapted to be received through the eyes of the eye bolts 40 and retain the gate 14 in a closed position.

Inasmuch as the gate 14 is hingedly connected to the gate post 10, it will be seen that the same may be opened by swinging the same about the hinge pins 30. When there is snow on the ground and it is undesirable to clear the snow prior to the opening of the gate 14, a limited amount of the gateway may be opened by merely sliding the members 24 of the gate section 18 within the tubular member 20 in the manner illustrated in Figure 2. By so positioning the members 24, one-half of the gateway may be opened.

Referring now to Figure 3 in particular, it will be seen that at least the central member 24 is tubular and has secured therein adjacent the inner end thereof a resilient strap 44, the resilient strap being secured to the member 24 at one end by a plurality of rivets 46. The other end of the resilient strap 44 is provided with a pin 48 which passes through a bore 50 in the member 24. The associated tubular member 20, which the member 24 is telescoped within, is provided with a similar bore 52 which is aligned with the bore 50 when the gate sections are in their extended position, as illustrated in Figure 1. When the bores 50 and 52 become aligned, the pin 48 passes through the same and locks the gate sections 16 and 18 against relative movement with respect to each other. When it is desired to telescope the members 24 of the gate section 18 within the tubular members 20, the pin 48 is depressed and the gate sections slid toward each other.

While the sections 16 and 18 have been described and illustrated as being portions of the gate 14, it will be seen that their use is not limited to being parts of a gate. For example, the sections 16 and 18 may be considered to form a single fence section which may have its end members secured to similar fence sections in any conventional manner to form temporary enclosures. Inasmuch as the fence sections would be of variable length, the enclosure may be of any size and shape desired. A fence section of this type would be highly desirable in the cases of county fairs, exhibitions, etc.

Other uses for a gate of the type described and illustrated above would be in counter constructions and the like. In utilizing the gate 14 in a counter construction, the gate section 16 may be disposed within a partition wall of the counter and the gate section 18 extending therefrom to close a passageway. When it is desired to gain access to the passageway, the gate section 18 is moved to one side in telescoping relation to its supporting gate section 16 in the manner described above.

While the tubular members 20 and the member 24 may be formed of any suitable material, it is preferred that the same be formed of aluminum tubing inasmuch as the same is relatively light in weight for its respective strength. By utilizing a light weight tubing, gates of relatively great length may be formed without the requirement of additional bracing. Furthermore, tubing is normally a readily attainable material which may be easily cut and assembled.

In order that the gate may be extremely rigid, the outer end portions of the tubular members 20, 20a and 20b are connected together by a vertical brace 54. As is best illustrated in Figure 2, the brace 54 is parallel to both end members 22 and 26.

The operation of this device will be understood from the foregoing description of the details thereof, taken in connection with the above recited objects and drawings. Further description would therefore appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. A gate comprising a first section and a second section, said first section including widely spaced elongated substantially parallel upper and lower tubular members, intermediate tubular members disposed in substantially parallel relation relative to each other and said upper and lower tubular members, said intermediate tubular members generally filling the space between said upper and lower tubular members said upper, lower and intermediate tubular members being connected at one of their adjacent ends to an end member which is adapted to be hingedly supported from a post, said upper, lower and intermediate tubular members at their opposite ends being open, a brace interconnecting said upper, lower and intermediate tubular members adjacent said last mentioned ends, said second section including second upper and lower tubular members telescopically received within said first mentioned upper and lower tubular members, second intermediate tubular members disposed between said second upper and lower tubular members and generally filling the space therebetween, said second intermediate tubular members being telescopically received within said first mentioned intermediate tubular members, ends of said second upper, lower and intermediate tubular members remote from said first mentioned end member being interconnected by a second end member, said second end member being adapted to be separately connected to a second post, whereby the gate may be selectively opened by swinging on said first mentioned post or by telescoping said second section into said first section.

2. The gate of the type set forth in claim 1 wherein at least one pair of telescopic members is provided with interengaging locking means to maintain the gate sections in a desired extended position.

References Cited in the file of this patent

UNITED STATES PATENTS

| | | |
|---|---|---|
| 1,079,166 | Cramer | Nov. 18, 1913 |
| 1,359,764 | Somers | Nov. 23, 1920 |
| 1,754,752 | Grim | Apr. 15, 1930 |
| 1,875,489 | Peterson | Sept. 6, 1932 |
| 2,231,381 | Boehmcke | Feb. 11, 1941 |
| 2,547,426 | Youngman | Apr. 3, 1951 |

FOREIGN PATENTS

| | | |
|---|---|---|
| 974,783 | France | Oct. 4, 1950 |